United States Patent
Nicholson et al.

(10) Patent No.: US 12,367,300 B2
(45) Date of Patent: Jul. 22, 2025

(54) SECURE ERASE OF USER DATA USING STORAGE REGIONS

(71) Applicant: Lenovo (Singapore) PTE. LTD., New Tech Park (SG)

(72) Inventors: John W. Nicholson, Cary, NC (US); Daryl C. Cromer, Raleigh, NC (US); Howard Locker, Cary, NC (US); Mengnan Wang, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 492 days.

(21) Appl. No.: 17/406,602

(22) Filed: Aug. 19, 2021

(65) Prior Publication Data

US 2023/0055285 A1 Feb. 23, 2023

(51) Int. Cl.
*G06F 21/62* (2013.01)

(52) U.S. Cl.
CPC ...... *G06F 21/6209* (2013.01); *G06F 21/6218* (2013.01)

(58) Field of Classification Search
CPC .. G06F 21/6209; G06F 3/0623; G06F 3/0631; G06F 3/0679; G06F 21/31; G06F 21/79
See application file for complete search history.

(56) References Cited

U.S. PATENT DOCUMENTS

| | | | | |
|---|---|---|---|---|
| 2008/0037050 A1* | 2/2008 | Sasaki | ................... | G06F 13/102 358/1.15 |
| 2009/0222915 A1* | 9/2009 | Challener | ............... | G06F 21/57 726/21 |
| 2011/0154023 A1* | 6/2011 | Smith | ..................... | H04L 9/321 713/168 |
| 2014/0278244 A1* | 9/2014 | Humphrey | ............. | G01N 21/01 702/182 |
| 2016/0004648 A1* | 1/2016 | Mukouchi | ........... | G06F 12/1458 726/30 |
| 2019/0042770 A1* | 2/2019 | Thibadeau, Sr. | ..... | G06F 3/0673 |
| 2019/0066073 A1* | 2/2019 | Yen | ....................... | G06Q 30/016 |
| 2020/0201558 A1* | 6/2020 | Cho | ........................ | G06F 3/064 |
| 2020/0393989 A1* | 12/2020 | Yeh | ........................ | G06F 3/064 |

FOREIGN PATENT DOCUMENTS

| | | | | |
|---|---|---|---|---|
| CN | 108230570 A | * | 6/2018 | |
| WO | WO-2007134116 A2 | * | 11/2007 | ........... G06F 3/0605 |

\* cited by examiner

*Primary Examiner* — Benjamin E Lanier
(74) *Attorney, Agent, or Firm* — Kunzler Bean & Adamson (57) ABSTRACT

Apparatuses, methods, systems, and program products are disclosed to securely erase user data using storage regions on a shared computing device. Memory stores code executable by the processor. The code is executable to configure a nonvolatile storage device of a shared device that may be used by multiple users but is exclusively used by one user at a time. The nonvolatile storage device has shared files storing system data and a data region storing user data associated with a user. The code executes to assign read-only privileges to the system region and read-write privileges to the data region before sharing the device with the user. Requests to write data to the nonvolatile storage device while the device is shared are serviced on the data region. When the user returns the shared device to the originator the code executes to erase the data region.

18 Claims, 5 Drawing Sheets

SECURE ERASE OF USER DATA USING STORAGE REGIONS

FIELD

The subject matter disclosed herein relates to shared computing devices among multiple users and particularly relates to secure retention and/or erasure of personal data and/or information on a serially shared/rented computing device.

BACKGROUND

Computers and other electronic computing devices, such as cellphones, are generally designed for a single long-term owner, such as a single user, family, or organization. Within a single owner domain, the security standards may be less than the security standards required in a shared economy where the user may share the electronic computing device with others outside the controlled ownership domain. For example, a computer shared with multiple users may require additional security measures to remove personal and/or confidential information that a user does not want to be shared with subsequent users, particularly if they are a competitor or outside the domain/control of the user.

The administrator and/or service provider of a shared computing device would benefit from the ability to assure the renter that the computing device has been cleaned and is acceptable for future users. The difficulty of removing all the files and/or personal information may increase; however, when the user retains the computing device more long term. For example, cleaning and/or removing personal data from a one-day rental may be less time-consuming than removing personal data from a computing device following a week or monthly rental. The administrator/service provider needs an efficient way to turn around the shared computing device while assuring each user that their data and privacy are secure. The volume of personal information left behind in log files, temp folders, cookies, and history files may further hamper the sharing process integrity and/or security. Even deleted files can leave recoverable amounts of data on the physical media that may be accessible for a skilled user.

Technology management of personal/confidential files and/or information on a shared device may result in the unwanted retention of personal information in the log files, temporary folders, cookies, and history files. Deletion of user files and information may leave recoverable information or data on the physical media. When the device is shared among multiple users, e.g., serially and/or exclusively from one user to another, the inadvertent sharing of personal files, information, and/or data may occur. Current solutions fail to provide a viable business model for short-term sharing (e.g., rentals) and provide low user confidence that personal data remains private.

BRIEF SUMMARY

An apparatus for secure erase of user data using storage regions is disclosed. An apparatus, in one embodiment, includes a processor and a memory that stores code executable by the processor. In one embodiment, the code is executable by the processor to configure a nonvolatile storage device of a shared device that is usable by multiple users and is exclusively used by one user at a time. The shared device may be retained by an originator when not used by one of the multiple users and the nonvolatile storage device may include shared files that store system data and a data region that stores user data associated with a user of the multiple users that is using the shared device. In further embodiments, the code is executable by the processor to assign read-only privileges to the system region and read-write privileges to the data region prior to sharing the shared device with the user such that requests to write data to the nonvolatile storage device while the device is shared are serviced on the data region. In one embodiment, the code is executable by the processor to erase the data region in response to the user returning the shared device to the originator when the shared device is no longer being shared.

In one embodiment, a method for sharing a computer includes configuring a nonvolatile storage device of a shared device to be usable by multiple users and exclusively used by one user at a time. The shared device is retained by an originator when not used by one of the multiple users. The nonvolatile storage device has shared files that store system data and a data region that stores user data associated with a user of the multiple users using the shared device. The method assigns read-only privileges to the system region and read-write privileges to the data region before sharing the shared device with the user. Requests to write data to the nonvolatile storage device while the device is shared are serviced on the data region. The data region is erased in response to the user returning the shared device to the originator when the shared device is no longer being shared.

In another embodiment, a computer program product with a computer-readable storage medium having program instructions embodied therewith is described. The program instructions are executable by a processor to cause the processor to configure a nonvolatile storage device of a shared device that is usable by multiple users. One user exclusively uses the shared device at a time. The shared device is retained by an originator when not being used by one of the multiple users. The nonvolatile storage device is configured by using the processor of an electronic device to have shared files that store system data and a data region that stores user data associated with a user of the multiple users using the shared device. The processor assigns read-only privileges to the system region and read-write privileges to the data region of the nonvolatile storage device before sharing the shared device with the user. Requests to write data to the nonvolatile storage device while the device is shared are serviced on the data region. The processor erases the data region of the nonvolatile storage device in response to the user returning the shared device to the originator when the shared device is no longer being shared.

BRIEF DESCRIPTION OF THE DRAWINGS

A more particular description of the embodiments briefly described above will be rendered by reference to specific embodiments illustrated in the appended drawings. Understanding that these drawings depict only some embodiments and are not, therefore, to be considered to be limiting of scope, the embodiments described and explained with additional specificity and detail through the use of the accompanying drawings, in which.

DETAILED DESCRIPTION

As appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, embodiments may take the form of a program product embodied in one or more computer-readable storage devices storing machine-readable code, computer-readable code, and/or program code, referred hereafter as code. The storage devices may be tangible, non-transitory, and/or non-transmission. The storage devices may not embody signals. In a specific embodiment, the storage devices only employ signals for accessing code.

Many of the functional units described in this specification have been labeled as modules to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices, or the like.

Modules may also be implemented in code and/or software for execution by various types of processors. An identified module of code may, for instance, comprise one or more physical or logical blocks of executable code, which may, for instance, be organized as an object, procedure, or function. Nevertheless, the executables of an identified module need not be physically located together but may comprise disparate instructions stored in different locations that, when joined together logically, comprise the module and achieve the module's stated purpose.

A code module may be a single instruction or many instructions and may even be distributed over several different code segments, among various programs, and across several memory devices. Similarly, operational data may be identified and illustrated within modules and embodied in any suitable form, and organized within any appropriate data structure type. The operational data may be collected as a single data set or distributed over different locations, including other computer-readable storage devices. Where a module or portions of a module are implemented in software, the software portions are stored on one or more computer-readable storage devices.

Any combination of one or more computer-readable mediums may be utilized. The computer-readable medium may be a computer-readable storage medium. The computer-readable storage medium may be a storage device storing the code. The storage device may be, for example, but not limited to, an electronic, magnetic, optical, electro-magnetic, infrared, holographic, micromechanical, or semiconductor system, apparatus, or device, or any suitable combination of the foregoing.

More specific embodiments (a non-exhaustive list) of the storage device would include the following: an electrical connection having one or more wires, a portable computer diskette, a hard disk, a random-access memory (RAM), a read-only memory (ROM), an (electronically) erasable programmable read-only memory (EPROM, EEPROM, and/or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for various embodiments may be written in any combination of one or more programming languages, including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer, or entirely on the remote computer or server. In the latter scenario, the remote computer may connect to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all the items are mutually exclusive unless expressly specified otherwise. The terms "a," "an," and "the" also refer to "one or more" unless expressly specified otherwise.

Furthermore, the described features, structures, or characteristics of the embodiments may combine in any suitable manner. The following description provides numerous specific details, such as embodiments of programming, software modules, user selections, network transactions, database queries, database structures, hardware modules, hardware circuits, hardware chips, etc., to provide a thorough understanding of embodiments. However, one skilled in the relevant art would recognize that embodiments may be practiced without one or more of the specific details or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. Each block of the schematic flowchart diagrams and/or schematic block diagrams, and combinations of blocks in the schematic flowchart diagrams and/or schematic block diagrams, can be implemented by code. This code may be provided to a processor of a general-purpose computer, a cellphone, a special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, another programmable machine, or other devices to produce a computer-implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may be executed substantially concurrently, or the blocks may sometimes be executed in the reverse order, depending upon the functionality involved. Other steps and methods may be conceived equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may indicate only the logical flow of the depicted embodiment. For instance, an arrow may indicate a waiting or monitoring period of unspecified duration between the illustrated embodiment's enumerated steps. Each block of the block diagrams and/or flowchart diagrams, and combinations of blocks in the block diagrams and/or flowchart diagrams, can be implemented by particular/special purpose hardware-based systems that perform the specified functions or acts or combinations of special purpose hardware and code.

The description of elements in each figure may refer to elements of proceeding figures. Like numbers refer to like elements in all figures, including alternate embodiments of like elements. In various embodiments, an apparatus with a processor and memory that stores code is described. The code may be executable by the processor to configure a nonvolatile storage device of a shared device. The shared device may be used by multiple users but is exclusively used by one user at a time. The shared device may be retained by an originator when not used by one of the multiple users. The nonvolatile storage device may have a system region with shared files that store system data and a data region that stores user data associated with a user of the multiple users using the shared device. The code is executable by the processor to assign read-only privileges to the system region and read-write privileges to the data region before sharing the shared device with the user. In this way, requests to write data to the nonvolatile storage device while the device is shared are serviced on the data region. The code may be executable by the processor to erase the data region in response to the user returning the shared device to the originator when the shared device is no longer being shared.

The code may be executable by the processor to allocate storage for user software applications and files on the data region in various embodiments. The processor executes the code to allocate storage on the data region for user software applications and files.

The code may be executable by the processor to execute the code to forward write instructions generated by an operating system, a firmware, or a user to the data region in response to a write instruction stored within the system region.

The data region may be an external nonvolatile storage device that can selectively connect to the nonvolatile storage device of the system region. The separate nonvolatile storage device of the data region may be separate from the shared device and/or may be retained by the user when the user returns the shared device to the originator.

The code may be executable by the processor to install an application on the shared device in the data region of the external nonvolatile storage device. The data region may be transferred to a second computing device. The second computing device runs the application installed in the data region of the external nonvolatile storage device.

The code may be executable by the processor to erase the data region in response to restarting an operating system of the shared device. For example, a software layer may enable the originator to restart the shared device and erase the data region. In other embodiments, the user may reset the user data. Throughout the present disclosure, in various embodiments the user and/or the originator may reset the user data stored in the data region before or in response to returning the computing device to the originator.

The code may be executable by the processor to execute the code to display that the data region has been successfully erased to the user. In various embodiments, the display may be sent to a user on a separate device, for example, by sending a text/SMS or email message to the user's cell phone. In embodiments, a block chain hash may be implemented. For example, a hash of the user data and/or system data contents may be entered for one or more of the data entries on the non-volatile storage device. In a specific embodiment, each data entry is stored in a chain/hash for the non-volatile storage device. In one embodiment, the hash at the time the shared device is rented or shared matches the hash after either removing the user data or when the shared device is returned to the originator.

In various embodiments, in response to a user using the shared device, the code may be executable by the processor to track write instructions to the data region in a log file while the system region operates with read privileges and the data region operates with read-write privileges. For example, in response to the shared device being returned to the originator, the code may be executable by the processor to execute the code to operate the system region and/or the data region with read-write privileges.

In embodiments, in response to the shared device being used by a user of multiple users, the code may be executable by the processor to write an initial copy of user data and applications to an external nonvolatile storage device and/or write the log file in the data region comprising each write instruction. When the shared device is returned to the originator, the code may be executable by the processor to copy the log file in the data region to the external nonvolatile storage device, erase the data region, and/or write the initial copy of user data and/or applications to the data region.

For example, the code may be executable by the processor to write a copy of the operating system and the firmware to an external nonvolatile storage device and update at least one firmware and/or the operating system on the system region. For example, the system region and the data region may be co-located on a single integrated nonvolatile storage device, and the system region may use the log file to erase data written on the data region while the user uses the shared device.

In another embodiment, a method of securely sharing a computer is described. The method includes a nonvolatile storage device of a shared device configured to be used by multiple users and exclusively used by one user at a time. The shared device can be retained by an originator when not used by one of the multiple users. The nonvolatile storage device may have shared files that store system data and a data region that stores user data associated with a user of the multiple users using the shared device. The method may assign read-only privileges to the system region and read-write privileges to the data region prior to sharing the shared device with the user. In this way, requests to write data to the nonvolatile storage device while the device is shared are serviced on the data region. The data region may be erased in response to the user returning the shared device to the originator when the shared device is no longer being shared.

The method may allocate memory for user software applications and files on the data region. For example, a memory-management routine can allocate memory on the data region for user software applications and files.

The method may forward all write instructions of an operating system, a firmware, and/or a user to the data region in response to a write instruction within the system region.

The data region may be separable from the nonvolatile memory device of the system region. For example, the data region may be an external nonvolatile memory device from the system region. The external nonvolatile memory device of the data region may be selectively connected to the system region and/or retained by the user when the user returns the computer to the originator.

An application may be installed on the shared device in the data region of the external nonvolatile memory device. An application may be transferred to the data region of a second computing device. The second computing device can run the application installed in the data region of the external nonvolatile memory device.

The data region may be erased in response to restarting an operating system of the shared device. For example, restarting the operating system may verify to the user that the data partition has been securely erased. A software layer may enable the originator to restart the shared device and/or prevent the user from restarting the shared device.

In some embodiments, the method tracks write instructions in a log file while the system region operates with read privileges, and the data region operates with read-write privileges in response to the shared device being used by a user of multiple users. The system region and/or the data region may operate with read-write privileges in response to the shared device being returned to the originator.

In various embodiments, the step of configuring the nonvolatile storage device includes allocating memory so that the storage device is functional in the absence of the data region and/or reassigning each write instruction of the shared device to the data region. For example, the step of erasing the data partition may format the data partition.

A computer program product, in another embodiment, includes a computer-readable storage medium having program instructions embodied therewith. The program instructions may be executable by the processor to cause the processor to configure a nonvolatile storage device of a shared device that is usable by multiple users and is exclusively used by one user at a time. The shared electronic device may be retained by an originator when not used by one of the multiple users. The nonvolatile storage device may have shared files that store system data and a data region that stores user data associated with a user of the multiple users using the shared device. The processor of the electronic device may assign read-only privileges to the system region and read-write privileges to the data region prior to sharing the shared device with the user. In this way, requests to write data to the nonvolatile storage device while the device is shared are serviced on the data region. The data region may be erased in response to the user returning the shared device to the originator when the shared device is no longer being shared.

In various embodiments, two partitions, disks, and/or regions are used to separate user data specific to an individual user from the shared files that are accessible to all users of the electronic computing device. For example, the shared files may include the operating system (O/S), drivers, applications, and/or programs. The user data, or modifications to the shared files of the system region and/or programs, is unique to each user of the shared device. The system registers or logs user preferences so that the same user has a similar/seamless experience regardless of the computing device used. The log may also secure that subsequent users will not access the private, personal, and/or confidential user data stored in the data region when the device is returned.

The user data may reconfigure the shared files on the system region and cause the system region to operate different. For example, a software layer below the operating system, such as a system or drive firmware, storage driver, or at a lower level of the filesystem within the operating system may reconfigure the operation of a program, application, or the operating system so that it appears to operate as a single storage area to the user. For example, the user may not recognize that various applications are drawing from memory partitions in the system and data regions while using the application.

Write operations of the user, operating system, or software layer may be redirected to the user data partition or disk. The software layer may track whether the system data partition or the disk has the valid (e.g., currently operatable) data or whether the data has been overwritten by the user preferences stored in the user data. The system data partition or disk may be read-only when the computing device is shared with a user. However, the system data partition may have read-write privileges when the shared computing device is returned to the originator or service provider. This may facilitate updates and/or services to provide maintenance to the computer system. Similarly, the user data partition or disk may have read-write privileges when rented or shared with a particular user. When the computer is returned to the originator, the user/originator may erase, physically remove, and/or format the user data to enable the computer to quickly and securely be rented or shared with a subsequent user while reducing the turnaround operations for the shared device.

In some embodiments, the system intelligently and seamlessly integrates user data for a user from one rental to the next. For example, a removable or external disk may be assigned to an individual user that stores personal user data. The system may identify the different classes of modifications for the user data or disk. For example, the system may identify different installations of applications and/or modifications to the run-time behavior of an installed program within the user data that is different from individual files saved in the memory. The system may log, register, and/or use separate memory to make the installs/modifications available to the individual user on subsequent rentals, even when the user rents different computers with different hardware components. For example, the user may rent a different machine and still have access to the installed/modified software installed on a previously rented machine, depending on the peripherals and hardware configuration of the prior and subsequent machines.

Figure 1:
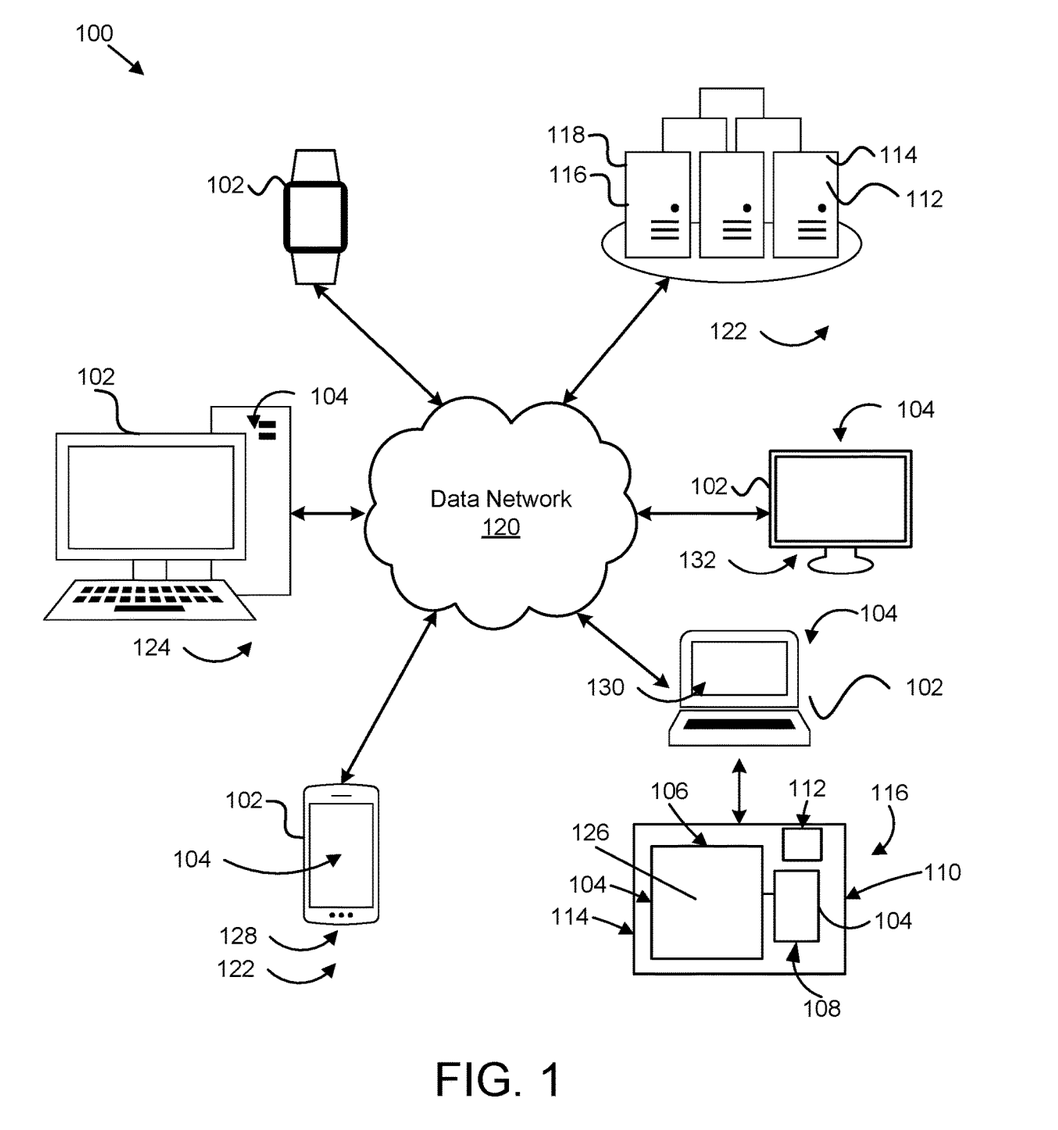
FIG. 1 is a schematic block diagram illustrating one embodiment of a system for securely erasing user data of a serially shared computing device.

FIG. 1 is a schematic block diagram illustrating one embodiment of a system 100 having a serially shared computing device 102 that securely erases user data 104 using separate storage regions (e.g., system region 106 and data region 108) on a nonvolatile storage device 110. The system 100 may include one or more shared computing devices 102 having processors 112 with various hardware components 114. A memory-management routine 116 may be located on the processor 112 of the shared computing device 102 and/or located on a separate server 118 of a data network 120. The system 100 may include one or more data networks 120 electronically coupling various computing devices 102 and/or servers 118.

The memory-management routine 116 may be located on the processor 112 and/or be electronically coupled to the processor 112. The memory-management routine 116 may communicate with the server 118. In another embodiment, the memory-management routine 116 is located on the server 118 and communicates with the server 118 to control the shared computing device 102 over the data network 120.

Although a specific number of shared computing devices 102, processors 112, hardware components 114, memory-management routines 116, data networks 120, and servers 118 are depicted in FIG. 1, one of skill in the art would recognize that the system 100 may include any number of shared computing devices 102, processors 112, hardware components 114, memory-management routines 116, master management devices, data networks 120, and/or servers 118.

In one embodiment, the system 100 includes one or more shared computing devices 102, each having a processor 112 with various features encoded within firmware 122 to activate and control various hardware components 114. Data regions 108 of firmware 122 may provide a mechanism for controlling all or a part of the functionality, technology, and/or features enabled/disabled on the hardware component 114.

The shared computing devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, an IoT vehicle (e.g., car, boat, airplane, etc.) or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

The processor 112 may include a semiconductor integrated circuit device (e.g., one or more chips, die, or other discrete logic hardware) or the like. The processor 112 may be a field-programmable gate array ("FPGA") or other programmable logic, firmware 122 for an FPGA or other programmable logic, microcode for execution on a microcontroller. For example, the processor 112 may be an application-specific integrated circuit ("ASIC"), a processor, a processor core, or the like. The processor 112 may be mounted on a printed processor 112 with one or more electrical lines or connections (e.g., volatile memory, a nonvolatile storage medium, a network interface, a peripheral device, a graphical/display interface, or the like).

The semiconductor integrated circuit device of the processor 112, for example, on the shared computing device 102 (or the hardware device of the memory-management routine 116) in certain embodiments, includes and/or is communicatively coupled to one or more volatile memory media, which may include but is not limited to random access memory ("RAM"), dynamic RAM ("DRAM"), cache, or the like.

In one embodiment, the semiconductor integrated circuit device, the processor 112, or other hardware appliance of the memory-management routine 116 and/or the shared computing device 102 includes and/or is communicatively coupled to one or more nonvolatile memory or nonvolatile storage device 110, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 120, in various embodiments, includes a digital communication network that transmits digital communications, for example, between a shared computing device 102 and a server 118. The data network 120 may include a wireless network, such as a wireless cellular network, a local wireless network, a Wi-Fi network, a Bluetooth® network, a near-field communication ("NFC") network, an ad hoc network, and/or the like. The data network 120 may include a wide area network ("WAN"), a storage area network ("SAN"), a local area network ("LAN") (e.g., a home network), an optical fiber network, the internet, or another digital communication network. The data network 120 may include two or more networks. The data network 120 may include one or more servers 118, routers, switches, and/or other networking equipment. The data network 120 may also include one or more computer-readable storage media, such as a hard disk drive, an optical drive, nonvolatile memory, RAM, or the like.

The wireless connection may be a mobile telephone network. The wireless connection may also employ a Wi-Fi network based on any Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 811 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection of data network 120 may be through an infrared connection, including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of this application's filing date.

One or more servers 118 may be embodied as blade servers, mainframe servers, tower servers, rack servers, etc., in one embodiment. The one or more servers 118 may be configured as mail servers, web servers, application servers, FTP servers, media servers, data servers, web servers, file servers, virtual servers, and/or the like. Servers 118 may be communicatively coupled (e.g., networked) over a data network 120 to one or more shared computing devices 102 and may be configured to execute or run machine learning algorithms, programs, applications, processes, and/or the like.

Figure 2A:
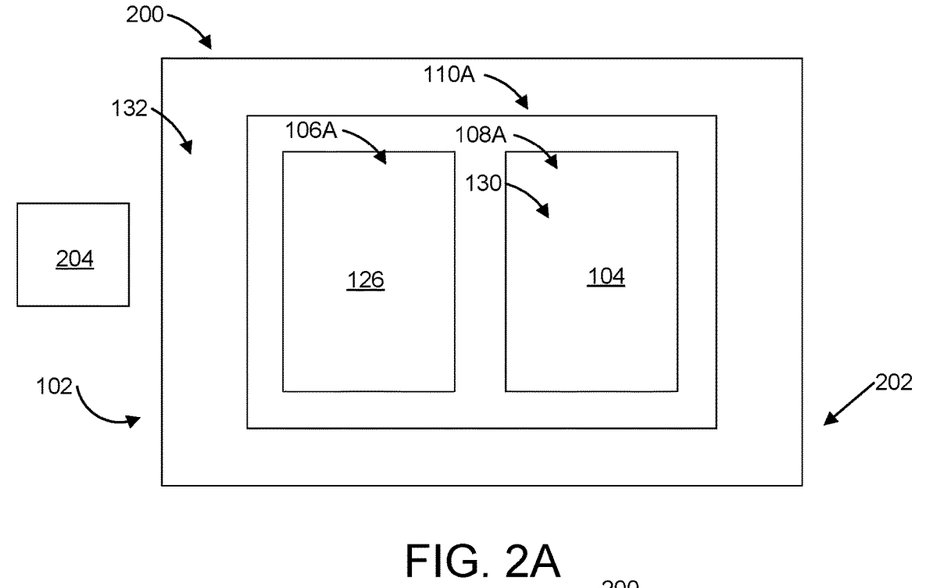
FIG. 2A is a schematic diagram illustrating a nonvolatile storage device of a shared device having a system region and a data region.
Figure 2B:
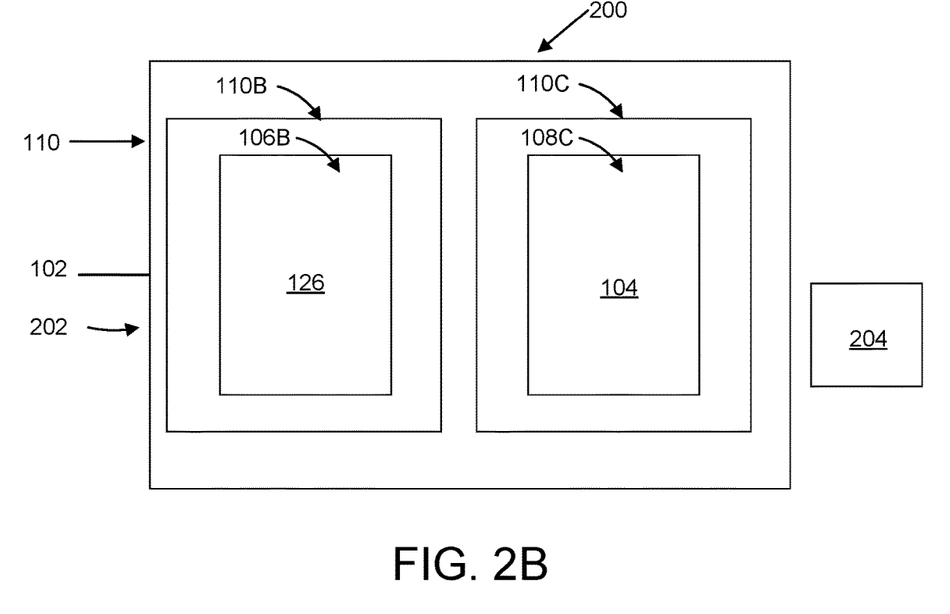
FIG. 2B is a schematic block illustrating a shared device with a first nonvolatile storage device for the system region and a second nonvolatile storage device for the data region.

FIG. 2A is a schematic diagram illustrating a shared computing device 102 with nonvolatile storage device 110A having a system region 106A and a data region 108A. FIG. 2B shows a shared computing device 102 having a first nonvolatile storage device 110B for the system region 106B and a second nonvolatile storage device 110C for the data region 108C. As used herein, nonvolatile storage device 110 may include the nonvolatile storage device 110A with a system region 106A and a data region 108A or a first nonvolatile storage device 110B with a system region 106B and/or a second nonvolatile storage device 110C for the data region 108C. Unless specifically identified otherwise, the nonvolatile storage device 110 may have either the shared configuration of FIG. 2A or the distinct configuration of FIG. 2B. FIG. 2B shows a separate configuration where the system region 106B is on a different nonvolatile storage device 110B than the data region 108C on nonvolatile storage device 110C.

The apparatus 200 or shared computing device 102 can also include a memory on a nonvolatile storage device 110 having various memory addresses. For example, nonvolatile storage device 110 may include ROM. In various embodiments, nonvolatile storage device 110 may include an erasable electronic read-only memory or EEPROM device. The nonvolatile storage device 110 may have addresses for data regions 108 of firmware 122, system software (e.g., an operating system 124), and/or other programs run by processor 112.

The apparatus 200 or shared computing device 102 includes a nonvolatile storage device 110, electronic memory. The nonvolatile storage device 110 may be divided into system region 106 and data region 108. In some embodiments, two or more nonvolatile storage devices 110 may include the system region 106 and/or the data region 108. The system region 106 may include shared files 126, such as firmware 122 and/or an operating system 124. The system region 106 or shared files 126 store system data accessible by the system, programs, applications, and/or multiple users of the shared computing device 102. In contrast, the data region 108 may store user data 104 and/or other confidential or private information or files associated with the particular user. The data region 108 may be associated with a particular user of the multiple/various users that of the shared computing device 102.

Additional hardware components 114 of the apparatus 200 may include a graphics card or GPU having a video codec and/or an audio codec, an RF Transceiver, a camera image signal processor 112, a Near Field Communications (NFC) wireless subsystem including a Bluetooth subsystem and/or a Wi-Fi subsystem, a digital signal processor or DSP, an artificial intelligence neural network or AI engine, a modem, such as a cellular modem, and connections to USB ports (e.g., I/O devices 128) and the like.

For example, the shared computing device 102 can have a charging port, a security support system, and/or cellular technology (e.g., a cellular modem). As used herein, various components are shown on a single component (e.g., video codec and audio codec on GPU) can be separated onto one or more different hardware components 114.

Each hardware component 114 includes data regions 108 storing the firmware 122 configured to enable one or more features to communicate with the processors 112 and/or system software 202 on the apparatus 200. For example, data regions 108 and/or firmware 122 may be stored on the nonvolatile storage device 110, such as an EPROM device, an EEPROM device, and/or a flash memory device. The CPU may utilize the system software 202 that communicates with and thereby utilizes the various enabled technologies and/or features of each hardware component 114. For example, the system software 202 may enable and/or enhance video codec on GPU through interactions of the CPU with the data regions 108 of firmware 122.

The system software 202 may be run by the CPU and/or other processors 112 to communicate and/or control features of connected hardware components 114. The system software 202 may be a processor-side application that facilitates and/or enables the communication between the CPU and various hardware components 114. As used herein, firmware 122 is a client-side code stored on the hardware component 114 that enables the hardware component 114 to communicate with the CPU and/or the apparatus 200. The system software 202 may include or interface with firmware 122 of the hardware component 114. The firmware 122 installed on the hardware component 114 may enable various features of the hardware components 114 that can be operated by the CPU and/or other processors 112.

The hardware component 114 includes one or more data regions 108 in the firmware 122 to selectively enable or disable the features of the hardware component 114. The data regions 108 provide selectivity for features of the apparatus 200 and enable granular specificity for enabled or disabled features. The apparatus 200 functionality is a compilation of the variation and quantity of the enabled features on the hardware components 114 and the ability to control/use the hardware component 114 through system software 202.

For example, the video codec of GPU enhances the apparatus 200 by providing a standardized format for communicating with the system software 202. When properly configured with the appropriate firmware 122, GPU enhances the apparatus 200 with the various features provided by the video codec to compress/decompress, communicate, transmit, and/or display video signals. However, each feature is only available to the apparatus 200 if the data region 108 is enabled and the appropriate firmware 122 is installed and readable by the system software 202 for the specific video codec and/or GPU feature.

Similarly, NFC wireless subsystems use standardized and appropriate firmware 122 to enable various Bluetooth and/or Wi-Fi subsystem features. The enabled data region 108 of the firmware 122 may enable the apparatus 200 to have a 5G cellular capability. In contrast, apparatus 200 without this firmware 122 would only have access to a 4G spectrum. The Wi-Fi subsystem may include another data region 108 with different firmware 122 for a Wi-Fi 6-ready feature compared to 802.11a/b/g, or 802.11n Wi-Fi features.

One feature of this application is configuring a device by installing and/or enabling various features of the software layer on the apparatus 200. The user may modify a digital architecture of one device and seamlessly use a subsequent device without reinstalling, modifying, and/or changing the software application on the subsequent apparatus 200. For example, if the user saves a presentation, document, or generic file, the file may be available on each subsequent rental of the computing device. User account/credentials and/or a register/log may associate the user data 104 with the files for the subsequent rental. In addition, an installed/modified application may be available on a subsequent rental with the same operating system 124. In embodiments, other application installations/modifications may be available if the operating system 124 is the same and a peripheral hardware component (e.g., GPU and/or camera) is available. For example, the second rented/shared apparatus 200 can include a cellular modem that supports both 4G and 5G features but have only 4G features enabled. For example, an external device 204 may be connected wirelessly, and/or electronically coupled through a wired electrical connection, to the apparatus 200.

Figure 3:
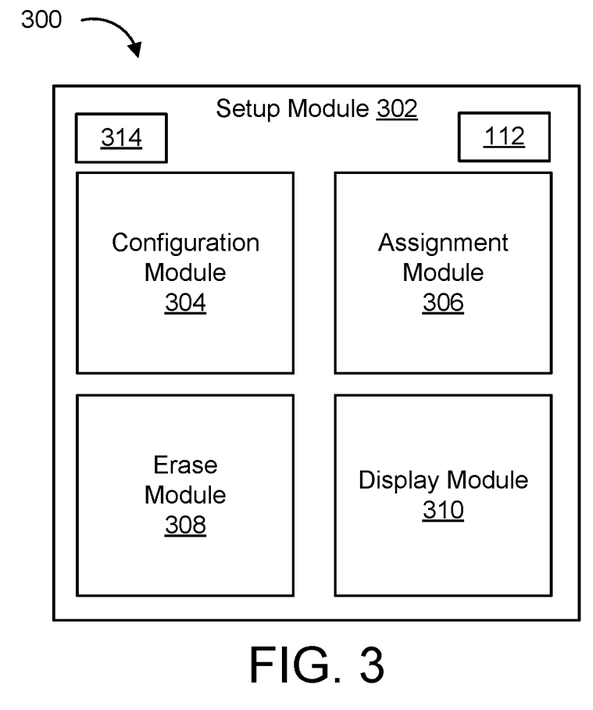
FIG. 3 is a schematic diagram illustrating one embodiment of a setup module for securely removing user data from the data region of a serially shared computing device.

FIG. 3 is a schematic diagram of an apparatus 300, e.g., the same or similar as a shared computing device 102, with a setup module 302 for securely removing user data 104 from the data region 108 of the apparatus 300 and/or serially shared computing device 102. The setup module 302 (e.g., the memory-management routine 116 operating on system software 202 of the shared computing device 102) may include code that is executable on processor 112 to enable/disable data regions 108 of the nonvolatile storage device 110 and/or control the firmware 122 of various hardware components 114. The setup module 302, in one embodiment, includes a configuration module 304, an assignment module 306, an erase module 308, and a display module 310.

Regarding FIGS. 1 through 3, the apparatus 300 has a processor 112 with memory 314 that stores code executable by the processor 112. The processor 112 operates one or more of the configuration module 304, the assignment module 306, the erase module 308, and/or the display module 310 to securely erase data regions 108, having the user data 104 of a particular user to securely remove private information from the system 100 and/or later users of the shared computing device 102. The processor 112 and/or nonvolatile storage device 110 use multiple storage regions (e.g., system region 106 and/or data region 108) that are configured to store different types of data and securely erase the confidential and/or private information of an individual user of the shared computing device 102. In various embodiments, the regions (e.g., system region 106 and/or data region 108) may include partitions, such as disk partitions, separate disks, and/or distinct regions of a disk. For example, the disk may have a system region 106 reserved with read-only privileges and a data region 108 with read-write privileges to write information for a particular user.

The configuration module 304, in one embodiment, configures the nonvolatile storage device 110 of the shared computing device 102. The configuration module 304, in certain embodiments, configures and/or updates the nonvolatile storage device 110 and separates the shared files 126 that store system data from the data region 108 that stores the user data 104. As described above, the configuration module 304 may use multiple disks (e.g., a nonvolatile storage device 110 for the system data and a separate nonvolatile storage device 110 for the user data 104). The configuration module 304 may use disk partitions of a single disk to separate the user data 104 from the system data on the shared computing device 102. The code of the configuration module 304 is executable by the processor to forward write instructions to the data region 108 in response to a write instruction within the system region 106. For example, the system region 106 includes the operating system 124, firmware 122, applications, and/or programs accessible to multiple users of the shared computing device 102. The code may be executable by the processor 112 to redirect write commands generated by the operating system 124, the firmware 122, and/or a user to the data region 108.

The configuration module 304 may configure a write instruction within the system region 106, e.g., by a program stored in the system region 106, to be forwarded to the user data region 108. In other embodiments, the configuration module 304 may copy the configuration of the system region 106 and/or the data region 108 prior to sharing the shared computing device 102 with a user. The originator may retain a copy of the system region 106 and/or the data region 108 prior to sharing the device with a user. When the user returns the device, the originator may run a program (e.g., in the erase module 308) that returns the system region 106 and/or the data region 108 to the copy made before sharing the device.

An originator may own and/or provide the shared computing device 102 loaned for a temporary time/duration to a user. For example, the originator may be a business entity that rents shared computing devices 102 with multiple users. The originator may be a school or university that provides kiosks for students. In various embodiments, the originator may be an administrator of a network of shared computing devices and/or an automated system for multiple users having a server 118 and multiple client computers (e.g., shared computing devices 102). The originator may be a public or private entity that administrates, owns, and facilitates renting/sharing of one or more shared computing devices 102. The originator may retain, control, update, and/or oversee the security and/or use of the shared computing device 102. For example, when the shared computing device 102 is not being used by one of the multiple users, it may be returned to the originator for software and security updates to the firmware 122 and/or operating system 124. The user may return the shared computing device 102 either physically or electronically when logged out of the system.

The assignment module 306 operates before sharing, renting, and/or leasing a user's shared computing device 102. The assignment module 306 operates the processor 112 to divide the nonvolatile storage device 110, such as partitioning and/or separating the memory allocation of the processor 112. In various embodiments, the system region 106 has read-only privileges. For example, a partition and/or nonvolatile storage device 110 has the shared files 126 that operate an operating system 124, including firmware 122, application, and/or program files shared by multiple users of the shared computing device 102. The shared files 126 may be stored in the system region 106 of the nonvolatile storage device 110 to provide user access to each user (of the multiple users) access to the shared program files.

The assignment module 306 may further assign read-write privileges to the data region 108 prior to sharing, renting, or leasing the shared computing device 102 with the user. For example, the originator may operate the assignment module 306 before leasing the shared computing device 102. The assignment module 306 may run in the background (e.g., as part of the operating system 124) during the duration of the rental or lease. For example, when the user opens, starts, or uses the shared computing device 102, the assignment module 306 may be configured to run such that requests to write data by the user, the operating system 124, firmware 122, applications, and/or programs are directed to the nonvolatile storage device 110 while the device is being shared. In one example, when the user is operating the shared computing device 102, the assignment module directs all write instructions to be serviced on the data region 108 of the nonvolatile storage device 110.

In some embodiments, the assignment module 306 assigns an unaltered state of the user data 104 and/or system data of the shared computing device 102 before the device is shared with a user. For example, the code may be executable by the processor to execute the code to allocate memory or storage on the nonvolatile storage device 110 for user software applications and/or files in the data region 108. The memory may include a memory-management routine 116 that allocates storage in the data region 108 for user software applications and/or files. When the user returns and re-rents the shared computing device 102, or a shared device on the data network 120, the memory-management routine 116 may identify the user and run the data region 108 for that particular user. In this way, the memory-management routine 116 facilitates the shared computing device 102 to run programs, applications, and/or files in the data region 108 that are not accessible by other users.

In one embodiment, the data region 108 is a separate nonvolatile storage device 110 from the system 106. The data region 108 may be separable from the nonvolatile storage device 110. For example, the data region 108 can be selectively coupled to the system region 106 when the user accesses the shared computing device 102. In embodiments where the data region 108 and the system region 106 are separate and the data region 108 is selectively coupled to the system region 106, the separate nonvolatile storage device 110 having the data region 108 may be separated and/or retained by the user. When the user returns the shared computing device 102 to the originator, the user retains the data region 108 and may reuse the personal data region 108 when they return to the shared computing device 102 or another device. In one embodiment, each user has two data regions 108: one on the shared computing device 102 that is affiliated and/or logged for the particular user, and a data region 108 that is selectively coupled to the system region 106.

In some embodiments, the system region 106 and the data region 108 are on the same, single integrated nonvolatile storage device 110. The system region 106 may use a log file 130 to erase user data 104 written on the data region 108 while using the shared computing device 102. For example, the erase module 308 may format the data region 108 having the user data 104 and/or update the shared files 126 on the system region 106. The erase module 308 may overwrite the user data 104 with other data, such as 0, 1, and/or random data. The erase module 308 may remove pointers and/or links to data locations stored in memory on the nonvolatile storage device 110 or change the pointers to memory locations that store random bits, such as 0's and 1's and/or NULL. The erase module 308 may include multiple passes. For example, the erase module 308 may repeatedly write a series of 0's, 1's, random, and/or NULL bits or pointers to remove/erase the data from the data region 108 of the nonvolatile storage device 110. For example, the erase module 308 may make 2, 3, 4, 5, 6, 7, 8, 9, 10 or more passes of random or NULL bits/pointers to the data region 108 to securely remove and delete any personal, private, or confidential information of a user.

When the shared computing device 102 is shared and/or used by a single user, the erase module 308 may write an initial copy of the user data 104, programs, and/or applications to an external nonvolatile storage device 110 and write the log file 130 in the data region 108. In this way, the assignment module 306 may cause each write instruction of the processor 112 and/or the shared computing device 102 to be directed to the user data 104 and/or log file 130 to log/record the changes to the user data 104 in the log file 130.

When the user returns and/or logs out of the shared computing device 102, the erase module 308 causes the processor 112 to erase the data region 108. For example, when the user returns the shared computing device 102 to the originator (e.g., by logging off, returning the device, and/or terminating the lease on the device), the shared computing device 102 operates the erase module 308. The erase module 308 removes any user data 104 written in the data region 108 of the nonvolatile storage device 110 of the shared computing device 102. In this way, when the shared computing device is no longer shared, any personal or confidential data of the user is removed from the shared computing device 102 by erasing and/or formatting the user data 104 on the nonvolatile storage device 110.

When the shared computing device 102 is used by a particular user of multiple users, the code may execute and track each write instruction to the data region 108. The particular user may be associated with the write instructions and/or the data region 108 in the log file 130. In other words, the log file 130 may associate the write instructions and/or data region 108 with written files, applications, and/or programs to the particular user. When shared, the shared computing device 102 operates the system region 106 with only read privileges, and the data region 108 operates with both read-write privileges. When the shared computing device 102 is returned to the originator, the system region 106 is operated with read-write privileges. The data region 108 may be operated with only read privileges, erase privileges, and/or read-write privileges. When the data region 108 is operated with only read privileges, an administrator may have formatting/erase privileges to delete all the files for the particular user securely. For example, if the user terminates a rental agreement and/or graduates from the university. Alternatively, the administrator may have privileges to remove viruses, objectionable materials, and/or other user data 104 from the data region 108 of a particular user that violates a rental and/or administrative policy.

In various embodiments, the erase module 308 works in conjunction with the configuration module 304 and/or the assignment module 306 to securely erase the user data 104. For example, the configuration module 304 may cause the assignment module 306 to copy the nonvolatile storage device 110 (e.g., the user data 104 and/or the shared files 126) before sharing the device. The erase module 308 may format the data region 108 of the nonvolatile storage device 110 and/or rewrite/update the system region 106 with the shared files 126 for subsequent users of the shared computing device 102.

In some embodiments, the erase module 308 formats the user data region 108 and/or installs updates to software, operating systems 124, and/or firmware 122 in the data region 108. In other words, the erase module 308 may be operated when the shared computing device 102 is returned to the originator. The erase module 308 may run the system region 106 of the nonvolatile storage device 110 in a read-write mode. For example, the erase module 308 may call the configuration module 304 to configure the shared files 126 of the system region 106 to read-write privileges to update, install, and/or remove programs, applications, and/or shared files.

The erase module 308 may call, trigger, signal, or otherwise use the configuration module 304 to modify the read-write privileges of the user data 104 on the data region 108 of the nonvolatile storage device 110. For example, the erase module 308 may prevent the originator from erasing the user data 104. In this configuration, the erase module 308 may operate the assignment module 306 to log and/or store the user data 104 for the identified user in a partition and/or region of the nonvolatile storage device 110 that provides read-write privileges in the data region 108 for the user, but only read-erase privileges to an administrator. In some embodiments, other users of the shared computing device 102 may not read the user data 104 on the region/partition of the nonvolatile storage device 110.

In one embodiment, the display module 310 indicates to the operator that the erase module 308 has successfully removed/erased the private/confidential user data 104 from the shared computing device 102. For example, the processor 112 may execute the display module 310 code following the erase module 308 that erases the data region 108. In some embodiments, the erase module 308 executes to restart the operating system 124 of the shared computing device 102. For example, a software layer 132 may enable the originator to control the read-write privileges of restarting the shared computing device 102. The code may be executable by the processor to display to the user that the data region 108 has been successfully erased. For example, the display module 310 may send the user a text message, an email, a push notification, and/or display on a screen that the data region 108 has been successfully formatted and/or erased.

The software layer 132 may redirect write operations of the user, operating system 124, firmware 122, or other system region write commands. For example, the software layer 132 may exist just below the operating system 124 and forward write commands in a program from the system region 106 to the user data 104. The configuration module 304, assignment module 306, erase module 308, and/or display module 310 may be embedded in the software layer 132. The software layer 132 may track the write instructions in a register or log file 130 and/or determine whether the shared files 126 on the system region 106 is the valid, currently operatable code. For example, the software layer 132 may determine that the shared files 126 on the system region 106 have been overwritten by the user preferences stored in the user data 104 of the data region 108. When the shared computing device 102 is shared with a user, the system region 106 may be read-only. The system region 106 may have read-write privileges when the shared computing device 102 is returned to the originator. The read-write privileges of the service provider may enable the originator/service provider to update and/or service the shared computer system 102.

The user data 104 may be stored on a nonvolatile storage device 110 with read-write privileges when the shared computing device is shared. The originator may erase, physically remove, and/or format the user data 104 when the shared computing device 102 is returned to enable quick and secure sharing with a subsequent user and reduced turnaround time for the shared computing device 102 between different users.

The system 100 may intelligently and/or seamlessly integrate user data 104 for an individual user between rentals. A removable, external disk may be assigned to an individual user. The external disk can store the user's personal user data 104 unique to the individual user and not accessible by the originator or subsequent users of the system 100. In various embodiments, the system 100 may identify different classes of files and/or modifications of user data 104 stored in the data region 108 of the nonvolatile storage device 110. For example, different user configurations or application installations may affect the run-time behavior when operated with user data 104 stored on the data region 108. An installed program with the user data 104 may modify and/or differentiate the application during run-time when only the shared files 126 are available to the program. In addition, the user data 104 or other memory on the nonvolatile storage device 110 may save individual files. The assignment module 306 of the shared computing device 102 may log, register, and/or use separate memory to make individual installs and/or modifications available to an individual user on subsequent rentals.

In some embodiments, the modifications and/or application installations are available only when the user re-rents the same type or configuration of shared computing device 102. In other embodiments, the modification and/or application installation may be available to the user even when the user rents a different type of shared computing device, e.g., with one or more different hardware components 114. In other words, the modifications may be available when the user rents a different machine and retains access to the installed/modified software installed on a previously rented machine. For example, if the later machine has the same or similar peripheral hardware configuration (e.g., hardware components 114), the prior shared computing device 102 may be the same or compatible with the subsequent shared computing device 102.

For example, a data scientist (e.g., engineer, computer programmer, etc.) may rent a shared computing device 102 with a Graphical Processing Unit (GPU). The data scientist may install CUDAR drivers with computational software for a particular application. When the data scientist returns the shared computing device 102 to the originator, the user data 104 stored on the nonvolatile storage device 110 may retain the CUDA drivers configured for the GPU on the rented, shared computing device 102. The data scientist may retain the user data 104, e.g., on an external removable disk, or the assignment module 306 may record the user data 104 in a profile affiliated with the data scientist. If the data scientist returns and re-rents the shared computing device with the GPU, the CUDA drivers may be available since the user data 104 associated with the data scientist overrides the system region 106 operations of the GPU. However, if the data scientist rents a subsequent shared computing device 102 without a GPU, the CUDA drivers may be invisible to the subsequent shared computing device 102 without the GPU capability. The computational software application may still be available to the data scientist in this configuration, even though the CUDA drivers are not installed on the system without a GPU.

Updated drivers may not be visible when the user rents a machine with a different operating system. For example, the drivers may be different for a Windows-based system than a Linux-based system. Also, installed applications may not be visible to the data scientist/user since the shared computing device 102 identifies the installed file types as operable on a different operating system 124 than is currently running on the shared computing device 102. The system 100 recognizes and automatically updates the files available to the user based on the previous system and the hardware components 114 on the present/subsequent shared computing device 102. In other words, user data 104 in the data region 108 may always be available to the same user on subsequent rented or shared computing devices 102 when the rented prior and subsequent shared computing devices 102 have the same operating system 124 and/or hardware components 114. In addition, the user data 104 of the data region 108 may be available to the same user on subsequent shared computing devices 102 when the prior shared computing device 102 has the same applications, versions, and/or hardware components 114 as the subsequent shared computing device 102.

When the shared computing device 102 returns to the originator, the processor 112 copies the log file 130 in the data region 108 to the external nonvolatile storage device 110. The code may be executable by the processor to erase the data region 108 and/or write the initial copy of user data and applications to the data region 108. The processor 112 may write a copy of the operating system 124 and/or the firmware 122 to an external nonvolatile storage device 110. The processor 112 may write an update to at least one of the firmware 122 and/or the operating system 124 on the system region 106. The code may be executable by the processor to also operate the system region 106 and the data region 108 with read-write privileges when the shared computing device 102 is returned to or in possession of the originator.

The nonvolatile storage device 110 or memory may include electrically erasable programmable read-only memory (EEPROM) and/or an elastic flash read-only memory. The memory/storage device may be a stock Read-Only Memory ("stock ROM") device. EEPROM, flash, and/or stock ROM memory/storage may include a firmware 122 for each hardware component 114 on the apparatus 300. The system software 202 of one or more shared computing devices 102 can use the firmware 122 located in the nonvolatile storage device 110 to run the hardware component 114 and/or control various features of the hardware component 114. In various embodiments, the nonvolatile storage device comprises EPROM, EEPROM, flash memory, and/or stock ROM and thereby creates a new virtual apparatus 300 by controlling which data regions 108 of the firmware 122 are accessible by the operating system 124. In other words, the user data 104 on the nonvolatile storage device 110 can control the system regions 106 access to features on the hardware component 114 and thereby affect the software operation of the apparatus 300.

Figure 4:
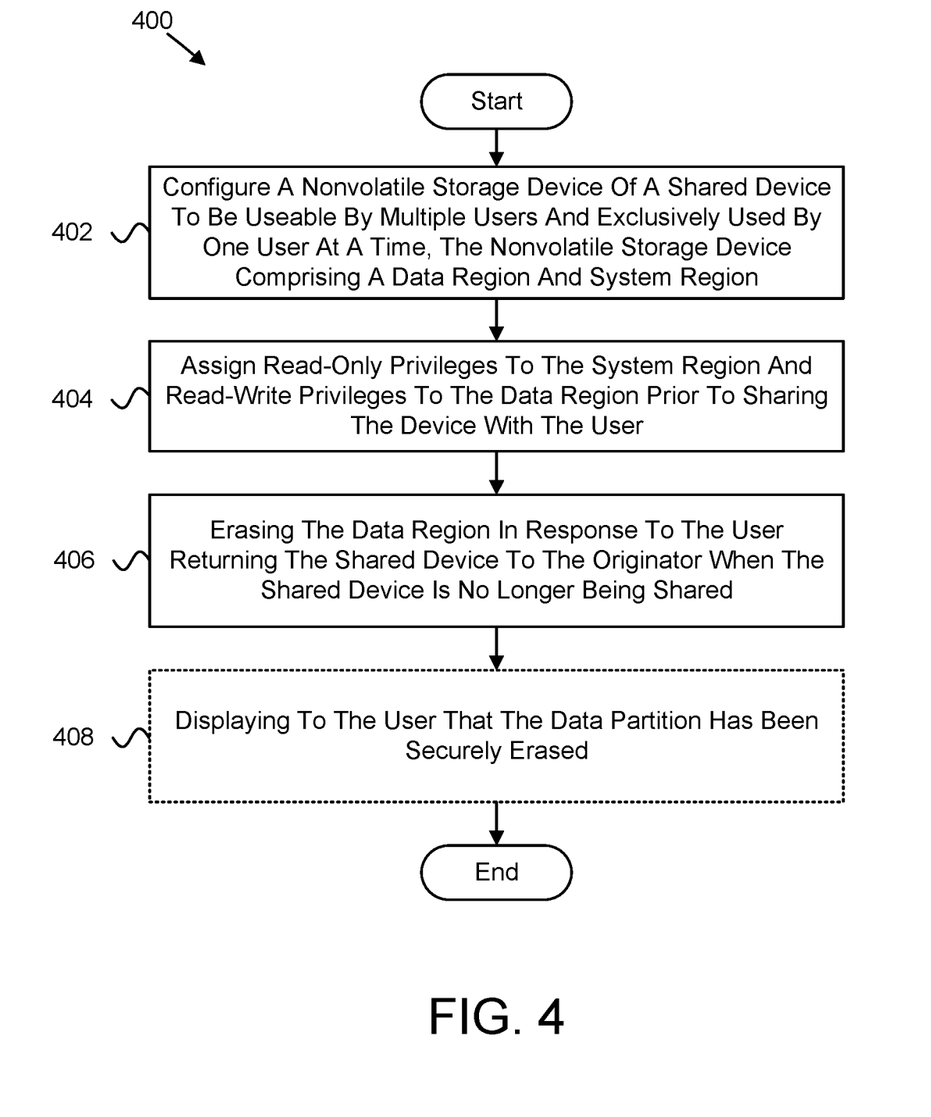
FIG. 4 is a schematic flow chart diagram illustrating a method for securely removing user data from the data region of the serially shared computing device.

FIG. 4 shows a method 400 for securely sharing a computer. The configuration module 304 configures 402 the nonvolatile storage device 110 of the shared computing device 102 to be usable by multiple users. The shared computing device 102 is used exclusively by one user and retained by an originator when not used by one of the multiple users. The nonvolatile storage device 110 includes shared files 126 that store system data and a data region 108 that stores user data 104 associated with a user of the multiple users using the shared device. Read-only privileges are assigned 404 to the system region 106, and read-write privileges are assigned 404 to the data region 108 prior to sharing the shared computing device 102 with the user such that requests to write data to the nonvolatile storage device 110 while the shared computing device 102 is being shared are serviced on the data region 108. The data region 108 is erased 406 in response to the user returning the shared computing device 102 to the originator when the shared computing device 102 is no longer being shared. The processor 112 may display 408 and/or confirm to the user that the data region 108 has been successfully erased 406. The method 400 ends.

Figure 5:
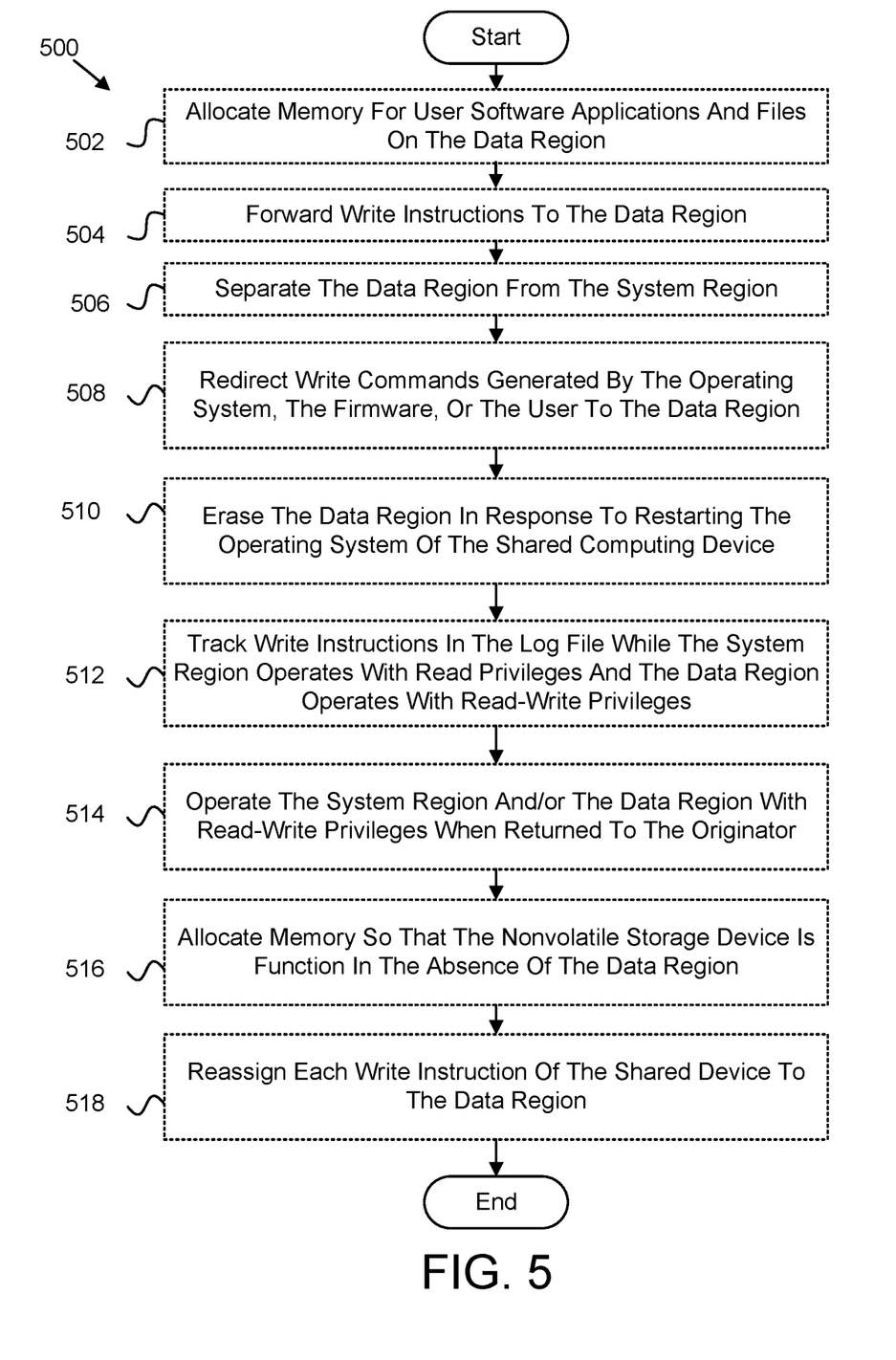
FIG. 5 is a schematic flow chart diagram illustrating optional methods for the embodiment shown in FIG. 4 to manage the removal of user data from the data region and facilitate user interaction with the system region.

FIG. 5 shows optional methods 500 of the method 400 shown in FIG. 4 for securely sharing a computing device by maintaining a system region 106 and a data region 108 and erasing the data region 108. Memory may be allocated 502 for user software applications and files on the data region. For example, the memory-management routine 116 may allocate 502 memory in the data region 108 for user software applications and/or files. Write instructions may be forwarded 504 to the data region 108 in response to a write instruction in system 106. For example, a write instruction generated by the operating system 124, applications, or programs stored within system region 106 is forwarded to the user data 104 in the data region 108.

In various embodiments, the data region 108 may be separated 506 from the nonvolatile storage device 110 of the system region 106. The data region 108 may be a separate nonvolatile storage device 110 different from the nonvolatile storage device 110 of the system region 106. The separate nonvolatile storage device 110 of the data region 108 may be selectively coupled and/or separated from the system region 106. The user may retain the nonvolatile storage device 110 of the data region 108 when returning the shared computing device 102 to the originator.

In some embodiments, write commands generated by the operating system 124, the firmware 122, or a user may be redirected 508 to the data region 108. Method 500 may further include erasing 510 the data region 108 in response to restarting an operating system 124 of the shared computing device 102. In some embodiments, a software layer 132 may enable the originator to restart the shared computing device 102 but prevents the user from restarting the shared computing device 102.

Write instructions may be tracked 512 in the log file 130 while the system region 106 operates with read privileges and the data region 108 operates with read-write privileges in response to the shared computing device 102 being used by a user of multiple users. The system region 106 and/or the data region 108 may operate 514 with read-write privileges in response to the shared computing device 102 is returned to the originator.

In some embodiments, step 406 of method 400 that involves erasing the data region 108 includes formatting the data region 108. Step 402 for configuring the nonvolatile storage device 110 may include allocating memory 516 so that the nonvolatile storage device 110 is functional in the absence of the data region 108. Step 402 may further reassign 518 each write instruction of the shared computing device 102 to the data region 108.

A computer program product is disclosed in one embodiment comprising a computer-readable storage medium having program instructions embodied therewith. The program instructions are executable by a processor 112 and cause the processor 112 to configure, using the processor 112 of an electronic device, a nonvolatile storage device 110 of a shared computing device 102. The shared computing device may be usable by multiple users but is exclusively used by one user at a time. The shared computing device 102 may be retained by an originator when not being used by one of the multiple users. The nonvolatile storage device 110 may have shared files 126 that store system data and a data region 108 that stores user data 104 associated with a user of the multiple users using the shared computing device 102. The processor 112 assigns read-only privileges to the system region 106 and read-write privileges to the data region 108 prior to sharing the shared computing device 102 with the user. As such, requests to write data to the nonvolatile storage device 110 while the shared device is serviced on the data region 108. The processor 112 may erase the data region 108 in response to the user returning the shared computing device 102 to the originator when the shared computing device 102 is no longer being shared.

Embodiments may be practiced in other specific forms. The described embodiments are to be considered in all respects only as illustrative and not restrictive. Therefore, the scope of the invention is indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
configure a nonvolatile storage device of a shared device that is usable by multiple users and is exclusively used by one user at a time, the shared device retained by an originator when not used by one of the multiple users, the nonvolatile storage device comprising a system region that stores shared files for system data and a data region that stores user data associated with a user of the multiple users that is using the shared device;
assign read-only privileges to the system region and read-write privileges to the data region prior to sharing the shared device with the user;
redirect write operations for a program from the system region to user data such that requests to write data to the nonvolatile storage device while the device is shared are serviced on the data region;
track the write operations in a log file that is stored in the data region;
detect connection of an external nonvolatile storage device to the shared device, the external nonvolatile storage device comprising an initial copy of user data and applications that are useable on a plurality of shared devices with different configurations;
identify user data and applications on the external nonvolatile storage device that are useable on the shared device based on a configuration of the shared device;
make the identified user data and applications on the external nonvolatile storage device accessible to the user on the shared device while hiding user data on the external nonvolatile storage device that is not useable on the shared device; and
in response to the shared device being returned to the originator:
copy the log file that is stored in the data region to the external nonvolatile storage device;
erase the data region; and
write the initial copy of user data and applications from the external nonvolatile storage device to the data region.

2. The apparatus of claim 1, wherein the code is executable by the processor to allocate storage for user software applications and files on the data region.

3. The apparatus of claim 1, wherein the code is executable by the processor to forward write instructions generated by the operating system, a firmware, or a user to the data region in response to a write instruction stored within the system region.

4. The apparatus of claim 1, wherein the data region is an external nonvolatile storage device that is selectively connected to the nonvolatile storage device of the system region and wherein the separate nonvolatile storage device of the data region is separated from the shared device and retained by the user when the user returns the shared device to the originator.

5. The apparatus of claim 4, wherein the code is executable by the processor to install an application on the shared device in the data region of the external nonvolatile storage device, and wherein the data region is transferred to a second computing device such that the second computing device runs the application installed in the data region of the external nonvolatile storage device.

6. The apparatus of claim 1, wherein the code is executable by the processor to display to the user that the data region has been successfully erased.

7. The apparatus of claim 1, wherein:
in response to the shared device being used by a user of the multiple users, the code is executable by the processor to track write instructions to the data region in the log file while the system region operates with read privileges and the data region operates with read-write privileges; and
in response to the shared device being returned to the originator, the code is executable by the processor to operate the system region and the data region with read-write privileges.

8. The apparatus of claim 7, wherein, in response to the shared device being used by a user of the multiple users:
the code is executable by the processor to write the initial copy of user data and applications to the external nonvolatile storage device, and write the log file in the data region comprising each write instruction; and
in response to the shared device being returned to the originator, the code is executable by the processor to copy the log file in the data region to the external nonvolatile storage device, erase the data region, and write the initial copy of user data and applications to the data region.

9. The apparatus of claim 7, wherein, in response to the shared device being returned to the originator, the code is executable by the processor to write a copy of the operating system and the firmware to the external nonvolatile storage device and write an update to at least one of the firmware and the operating system on the system region.

10. The apparatus of claim 9, wherein the system region and the data region are on a single integrated nonvolatile storage device, and the system region uses a log file to erase data written on the data region while the user uses the shared device.

11. A method of sharing a computer comprising:
configuring a nonvolatile storage device of a shared device to be usable by multiple users and exclusively used by one user at a time, the shared device retained by an originator when not used by one of the multiple users, the nonvolatile storage device comprising a system region that stores shared files for system data and a data region that stores user data associated with a user of the multiple users that is using the shared device;
assigning read-only privileges to the system region and read-write privileges to the data region prior to sharing the shared device with the user;
redirecting write operations for a program from the system region to user data such that requests to write data to the nonvolatile storage device while the device is shared are serviced on the data region;
tracking the write operations in a log file that is stored in the data region;
detecting connection of an external nonvolatile storage device to the shared device, the external nonvolatile storage device comprising an initial copy of user data and applications that are useable on a plurality of shared devices with different configurations;
identifying user data and applications on the external nonvolatile storage device that are useable on the shared device based on a configuration of the shared device;
making the identified user data and applications on the external nonvolatile storage device accessible to the user on the shared device while hiding user data on the external nonvolatile storage device that is not useable on the shared device; and
in response to the shared device being returned to the originator:
copying the log file that is stored in the data region to the external nonvolatile storage device;
erasing the data region; and
writing the initial copy of user data and applications from the external nonvolatile storage device to the data region.

12. The method of claim 11, further comprising allocating memory for user software applications and files on the data region.

13. The method of claim 11, further comprising forwarding all write instructions of the operating system, a firmware, or a user to the data region in response to a write instruction within the system region.

14. The method of claim 11, further comprising separating the data region from the nonvolatile memory device of the system region; wherein:
the data region is an external nonvolatile memory device from the system region; and
the external nonvolatile memory device of the data region is selectively connected to the system region and retained by the user when the user returns the computer to the originator.

15. The method of claim 14, further comprising installing an application on the shared device in the data region of the external nonvolatile memory device and transferring the data region to a second computing device such that the second computing device runs the application installed in the data region of the external nonvolatile memory device.

16. The method of claim 11, further comprising:
tracking write instructions in the log file while the system region operates with read privileges and the data region operates with read-write privileges in response to the shared device being used by a user of the multiple users; and
operating the system region and the data region with read-write privileges in response to the shared device being returned to the originator.

17. The method of claim 11, wherein the step of configuring the nonvolatile storage device comprises allocating memory so that the storage device is functional in the absence of the data region and reassigning each write instruction of the shared device to the data region, and wherein the step of erasing the data partition comprises formatting the data partition.

18. A computer program product, comprising a non-transitory computer-readable storage medium having program instructions embodied therewith, the program instructions are executable by a processor to cause the processor to:
configure, by use of the processor of an electronic device, a nonvolatile storage device of a shared device that is usable by multiple users and is exclusively used by one user at a time, the shared device being retained by an originator when not being used by one of the multiple users, the nonvolatile storage device comprising a system region that stores shared files for system data and a data region that stores user data associated with a user of the multiple users that is using the shared device;
assign read-only privileges to the system region and read-write privileges to the data region prior to sharing the shared device with the user;
redirect write operations for a program from the system region to user data such that requests to write data to the nonvolatile storage device while the device is shared are serviced on the data region;
track the write operations in a log file that is stored in the data region;
detect connection of an external nonvolatile storage device to the shared device, the external nonvolatile storage device comprising an initial copy of user data and applications that are useable on a plurality of shared devices with different configurations;
identify user data and applications on the external nonvolatile storage device that are useable on the shared device based on a configuration of the shared device;
make the identified user data and applications on the external nonvolatile storage device accessible to the user on the shared device while hiding user data on the external nonvolatile storage device that is not useable on the shared device;
in response to the shared device being returned to the originator:
copy the log file that is stored in the data region to the external nonvolatile storage device;
erase the data region; and
write the initial copy of user data and applications from the external nonvolatile storage device to the data region.

* * * * *